(12) United States Patent
Belovich (10) Patent No.: US 7,322,028 B2
(45) Date of Patent: Jan. 22, 2008

(54) METHOD AND SYSTEM FOR PROVIDING A VIRUS-IMMUNE, RULE-BASED CROSS-PLATFORM SOFTWARE SYSTEM

(76) Inventor: Steven G. Belovich, 1229 River Woods, Hinckley, OH (US) 44233

( * ) Notice: Subject to any disclaimer, the term of this patent is extended or adjusted under 35 U.S.C. 154(b) by 767 days.

(21) Appl. No.: 10/247,731

(22) Filed: Sep. 19, 2002

(65) Prior Publication Data

US 2003/0055944 A1    Mar. 20, 2003

Related U.S. Application Data

(60) Provisional application No. 60/323,575, filed on Sep. 19, 2001.

(51) Int. Cl.
  *G06F 9/44*      (2006.01)
  *G06F 9/445*     (2006.01)
  *G06F 11/00*     (2006.01)
(52) U.S. Cl. .................... 717/168; 717/174; 714/15
(58) Field of Classification Search ............... 709/223, 709/238; 726/23, 14, 22; 707/1
  See application file for complete search history.

(56) References Cited

U.S. PATENT DOCUMENTS

| | | | |
|---|---|---|---|
| 5,339,435 A | 8/1994 | Lubkin et al. | |
| 5,414,846 A | 5/1995 | Lemble et al. | |
| 5,459,854 A | 10/1995 | Sherer et al. | |
| 5,742,829 A | 4/1998 | Davis et al. | |
| 5,764,226 A | 6/1998 | Consolatti et al. | |
| 5,797,015 A | 8/1998 | Daniels, Jr. et al. | |
| 5,909,575 A | 6/1999 | Perry | |
| 5,913,061 A | 6/1999 | Gupta et al. | |
| 5,931,909 A | 8/1999 | Taylor | |
| 5,933,646 A | 8/1999 | Hendrickson et al. | |
| 5,933,647 A | 8/1999 | Aronberg et al. | |
| 5,950,010 A | 9/1999 | Hesse et al. | |
| 5,950,011 A | 9/1999 | Albrecht et al. | |
| 5,953,533 A | 9/1999 | Fink et al. | |
| 5,970,243 A | 10/1999 | Klein et al. | |
| 5,978,579 A | 11/1999 | Buxton et al. | |
| 6,006,035 A | 12/1999 | Nabahi | |

(Continued)

FOREIGN PATENT DOCUMENTS

WO    WO 00/14618 A    3/2000

OTHER PUBLICATIONS

Solte D et al., "Federated management of distributed data and services" Computers In Industry, Elsevier Science Publishers, Amsterdam, NL, vol. 43, No. 3, Dec. 2000, pp. 203-210, XP004218314, ISSN: 0166-3615.

(Continued)

*Primary Examiner*—Wei Zhen
*Assistant Examiner*—Chih-Ching Chow
(74) *Attorney, Agent, or Firm*—Benesch, Friedlander, Coplan & Aronoff LLP (57) ABSTRACT

A method and system for providing a virus-immune, rule-base, cross-platform software system is disclosed. The system can be configured provide industry-specific and user-specific functionality to end-users without writing custom code. The system can be also be configured act as an industry-specific software product merely by changing the configuration information. The software system deploys in a client-server environment and delivers functionality independent of the client platform or operating system.

18 Claims, 8 Drawing Sheets

U.S. PATENT DOCUMENTS

| | | | |
|---|---|---|---|
| 6,029,196 A | 2/2000 | Lenz | |
| 6,038,399 A * | 3/2000 | Fisher et al. | 717/178 |
| 6,059,842 A | 5/2000 | Dumarot et al. | |
| 6,065,116 A | 5/2000 | Isaacson et al. | |
| 6,066,182 A | 5/2000 | Wilde et al. | |
| 6,085,247 A * | 7/2000 | Parsons et al. | 709/227 |
| 6,088,803 A * | 7/2000 | Tso et al. | 726/22 |
| 6,128,011 A | 10/2000 | Peng | |
| 6,178,502 B1 | 1/2001 | Caswell et al. | |
| 6,199,158 B1 | 3/2001 | Hirsch | |
| 6,208,336 B1 | 3/2001 | Carter | |
| 6,223,345 B1 | 4/2001 | Jones et al. | |
| 6,230,309 B1 | 5/2001 | Turner et al. | |
| 6,230,318 B1 | 5/2001 | Halstead et al. | |
| 6,247,128 B1 * | 6/2001 | Fisher et al. | 713/100 |
| 6,256,773 B1 | 7/2001 | Bowman-Amuah | |
| 6,269,456 B1 * | 7/2001 | Hodges et al. | 714/38 |
| 6,269,480 B1 | 7/2001 | Curtis | |
| 6,282,568 B1 | 8/2001 | Sondur et al. | |
| 6,282,711 B1 | 8/2001 | Halpern et al. | |
| 6,289,382 B1 | 9/2001 | Bowman-Amuah | |
| 6,298,481 B1 | 10/2001 | Kosaka et al. | |
| 6,301,707 B1 | 10/2001 | Carroll et al. | |
| 6,560,719 B1 * | 5/2003 | Pham et al. | 714/15 |
| 6,721,721 B1 * | 4/2004 | Bates et al. | 707/1 |
| 6,957,347 B2 * | 10/2005 | Braam et al. | 726/22 |
| 7,076,652 B2 * | 7/2006 | Ginter et al. | 713/153 |
| 2002/0091835 A1 * | 7/2002 | Lentini et al. | 709/227 |
| 2003/0014476 A1 * | 1/2003 | Peterson | 709/203 |

OTHER PUBLICATIONS

European Search Report for European Patent Application No. 02 775 882.0-2211, Mar. 16, 2000.

* cited by examiner

METHOD AND SYSTEM FOR PROVIDING A VIRUS-IMMUNE, RULE-BASED CROSS-PLATFORM SOFTWARE SYSTEM

CROSS-REFERENCE TO RELATED APPLICATIONS

This application claims the benefit of U.S. Provisional Application No. 60/323,575 filed Sep. 19, 2001.

FIELD OF THE INVENTION

This invention relates in general to software systems, and in particular to an architecture configured to provide a virus-immune and interoperable software system.

BACKGROUND OF THE INVENTION

Recently, a large variety of new computer-based business and manufacturing automation systems have been introduced. New hardware products are coming out at an incredible rate, while new software products are being introduced even more quickly. Although the data analysis, information management and control capabilities brought by these new products have certainly been of great benefit, the products, when installed and configured, seldom meet expectations at anywhere near the projected costs.

One significant problem is constant, never-ending software development. Although the capabilities and features of software packages have increased greatly in the last ten (10) years, the need for programmers and programming services has grown even more rapidly. This is true across various types of software including general packages and those directed towards business and manufacturing automation. The successful system integration of common software packages invariably demands that a great deal of custom code be designed, written and debugged, which is a costly and error-prone activity.

Another emerging and largely unanticipated problem is cyber attacks and other malicious software. Nearly all software systems were designed assuming a benign operating environment in which program operation would proceed without interference. Unfortunately, this assumption is violated nearly every day, especially since Sep. 11, 2001. Cyber attacks are increasing in frequency and in severity and vast majority existing software systems are unable to operate properly under such conditions.

"Stop-gap" measures such as firewalls and anti-virus software have been employed to provide some degree of protection. However, none of these techniques and technologies can provide 100% protection. Firewalls have been successfully breached by teenagers and anti-virus software only works for known virus instances. Software skill sets have migrated across the globe with the natural consequence of a dramatic rise in the sophistication of malicious software used in cyber attacks. This situation is expected to worsen as the software tools and technologies available to the attackers rivals those available to the defenders.

Systems integration firms and end users are devoting an ever-increasing fraction of their budgets to cyber defense, software design, programming and verification. Pedestrian software activities such as configuring a firewall, creating custom menus, formatting dialog boxes, creating custom displays and the like can usually be done via traditional "point-and-click" or by at most editing a script file. Unfortunately, this traditional level of flexibility is woefully inadequate to meet end users' changing needs in a timely and cost-effective manner.

Figure 1:
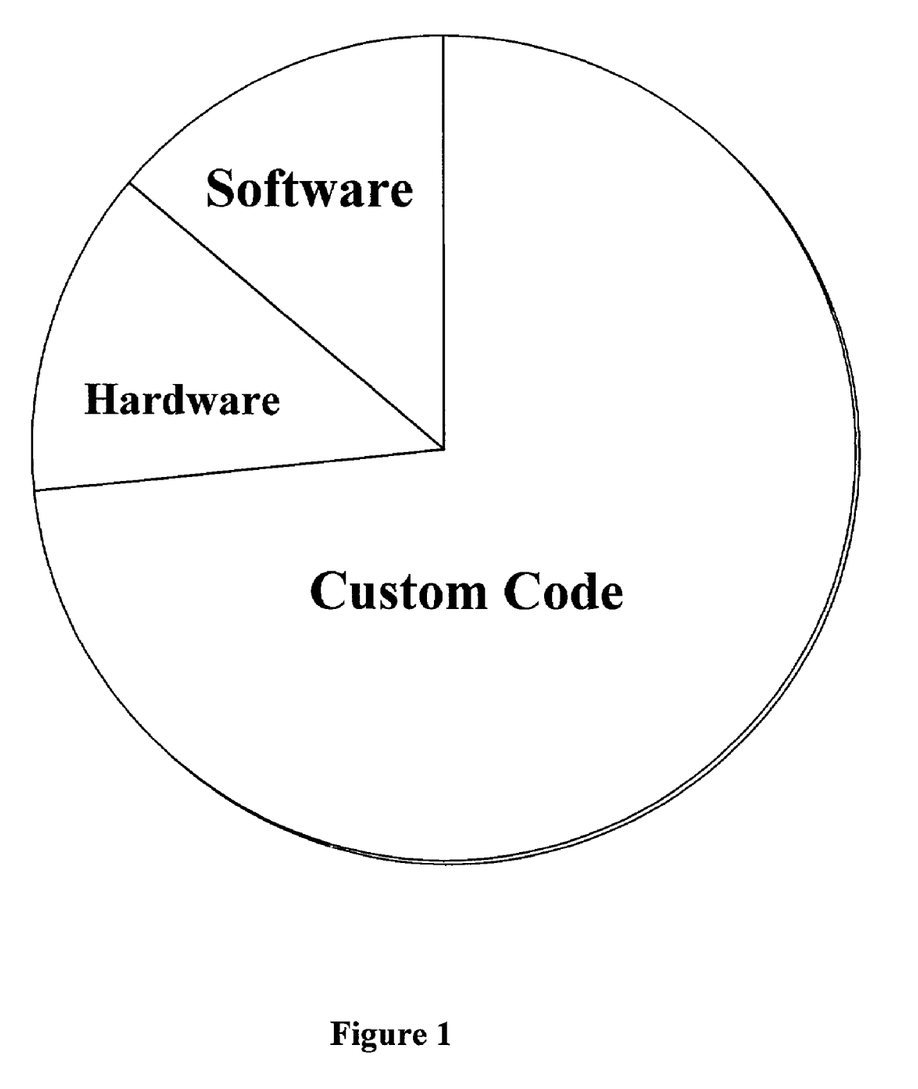
FIG. 1 is a graphical image representative of costs to implement a business or manufacturing automation software project, according to the prior art.

More sophisticated software efforts, such as implementing a new business rule, conforming to new data analysis & reporting regulations, increasing system security, executing a custom menu option, and the like invariably requires significant custom code development in a computer language such as Visual Basic, Visual C or Java. Additionally, to obtain the desired level of end-user functionality, still more custom code must be designed, written and debugged. Further, if the original application was not architected well, it may not even be possible to add this new functionality without extensively rewriting it. The cost of these software design and programming efforts is significant and is considerably greater than the cost of the original out-of-the-box software package. FIG. 1 illustrates a typical cost breakdown of implementing a business or manufacturing automation software project.

Nearly all companies maintain Information Technology (IT) departments to handle software installations, upgrades, and custom code development. Significant fractions of companies' operating budgets are allocated to IT departments for these tasks. Companies who are not even in the software business must still make large financial and personnel investments in Information Technology. Thus, both human and capital resources are inefficiently expended on tasks far outside the companies' area of core competency and industry. Cyber defense and software security efforts exacerbate this situation and are beginning to consume a significant fraction of both corporate and government resources.

New operating systems and platform products are introduced into the market at a phenomenal rate. This rapid change often requires application software to be redesigned just to continue to operate with the new computer platform, operating system and/or other application. Thus, many companies' software development efforts and expenses are now driven by external market forces that are completely unrelated to their core business or market. Unfortunately, money spent on this type of software development may not even directly improve productivity, product quality or increase sales. It may even negatively impact profitability and cash flow. The same is true for cyber defense and software security efforts. These activities negatively impact cash flow because they are required for successful business operation yet they do not have direct business benefit in terms of sales, product quality improvement or cost reduction.

A new method and apparatus is thus needed which overcomes the above-mentioned problems and others.

SUMMARY OF THE INVENTION

In accordance with an aspect of the present invention, a single software application provides desired functionality to users in a client-server architecture irrespective of the operating system (O/S) which is running on any given client.

In accordance with another aspect of the present invention, the single application and server platform on which it operates is secure. The server platform and operating system implement the "Reference Monitor" software security architecture that is well-known in the art to provide a "Trusted Computing Base" (TCB). The reference monitor enforces a predetermined (and adjustable) system security policy by controlling the access of every subject to every object in the software system. The reference monitor maintains an access control list (ACL) which determines which subjects have access to which objects and the manner of allowed access. Subjects can be active entities, user processes, etc. while objects can be files, directories, passive data repositories, etc. The reference monitor also maintains a tamper proof audit trail so that security-related events can be tracked and reported. The single application uses this TCB as the platform to help ensure its security.

In accordance with another aspect of the present invention, the software configuration process corresponds to a software development process that eliminates or significantly reduces the amount of coding required to create a new application or to modify an existing application.

In accordance with another aspect of the invention, the software system is architected so that it standardizes on multi-vendor-controlled interfaces between major elements—rather than standardizing on vendor-specific, client operating systems, Application Programmer Interfaces (APIs) and other rapidly changing items. Multi-vendor-controlled interfaces are those interfaces that cannot be changed by one software vendor alone. Rather, an interface change requires the express consent of multiple and competing software vendors in the marketplace. Examples of multi-vendor-controlled interfaces/standards are SQL for database access and TCP/IP for network communication. Examples of single-vendor-controlled interfaces/standards are OLE for Object Linking and Embedding for inter-application data object sharing, and NetBUI and NetDDE for network communication, all of which are strictly controlled by Microsoft. Further, these single-vendor-controlled interfaces/standards only apply to Microsoft operating systems and Wintel platforms. Experience has shown that multi-vendor-controlled interfaces/standards have a much longer lifetime than any other type of software "standard" and that they are much more universal in their usage. Standardizing on these types of interfaces—and avoiding the ephemeral, single-vendor-controlled interfaces, is an aspect of the invention and it assures that systems constructed in accord with the invention will have a long operational lifetime.

In accordance with another aspect of the present invention, the single application that provides the functionality to the end user is immune to desktop computer viruses. The TCB and the single application as a system are configured to ensure that virus script files, malicious desktop executable images, time bombs and the like cannot execute on the server or interfere with the proper operation of the single application in any way.

In accordance with another aspect of the present invention, a method is provided whereby the precise functionality implemented by the single application can be altered or enhanced in real time and delivered to the client machines irrespective of the client machine's O/S.

In accordance with another aspect of the present invention, the software system can often provide the user-specific functionality without writing new code. The software system alters its functionality into the required form, as determined by a configuration process. Note that this transformation process is one of functionality only. The software system's code itself does not change. The configuration process is flexible enough to change the functionality provided by this single application, including displays, menu options, database tables and structures, data analysis processes, operating rules, reports, graphic objects, and the like. In short, the single application can provide nearly any data acquisition, analysis, presentation and archiving functionality by the configuration process.

In accordance with another aspect of the present invention, the extreme flexibility of the single application enables behavior corresponding to a family of industry-specific software products. The single application, when combined with the results of the configuration process, say configuration results "A", becomes the industry-specific software product "A". The same single application, when combined with configuration results "B", becomes the industry-specific software product "B". In this manner, the single application provides a family of industry-specific software products.

In accordance with another aspect of the present invention, the ability of the single application to become a variety of industry-specific software products significantly reduces the amount of software development effort and support for this set of software products. Traditionally, one software engineering team and one technical support team would be required for each software product a company makes. A total of "N" software products would require "N" software engineering teams and "N" technical support teams. The invention reduces support needs to only one software engineering team and technical support team since there is only one application. Systems configured under the teachings of the present invention enjoy an N-to-1 reduction in the amount of staff and expense needed for software development and technical support.

In accordance with another aspect of the present invention, an application communicating via at least one network provides functionality with client machines of any kind, including desktop platforms (PCs), Personal Digital Assistants (PDAs), midrange machines, and the like.

In accordance with another aspect of the present invention, a single executable application provides desired functionality to clients regardless of the computing environment (e.g. Linux, Windows, Palm and the like), the connection mode to the server (e.g. networked, serial, wireless and the like), and the mix of various client operating systems. The application provides the functionality in part by an enabling architecture which is independent of quickly changing code (client or operating systems) and their associated application program interfaces.

In accordance with another aspect of the present invention, a single executable application and the configuration process results (files, database, etc.) can take advantage of new client machine technologies and operating systems. The single application need not be re-designed, re-invented, re-configured nor rewritten to do this. During the communication process with the client, a translation is performed that converts the communicated items to/from a form that the client machine can understand. This translation is done dynamically, on-the-fly during any communication with the client. When a new client machine is invented, all that is needed to take advantage of it is a new translation module that can convert communicated items to/from a form that the new client understands. This translation module impacts neither the operation nor the functionality of the single application in any way. Thus the single application is designed in a client-independent fashion and does not incorporate client-specific items in its architecture. This feature preserves the substantial investment in software purchase and configuration effort because the single application (performing industry-specific functions for an end user) can take nearly immediate advantage of new technology without undue expense and without significant interruption in service. This feature is also a significant improvement in the state-of-the-art, which requires that an existing application be redesigned/reworked to work with a new client operating system and/or platform.

In accordance with another aspect of the present invention, the single executable application can be configured to provide client-specific functionality which can be implemented and maintained by a single support team.

In accordance with another aspect of the present invention, the single executable application can be configured to act as a standalone software product, tailored to any desired industry vertical market (e.g., metal forming, pharmaceutical production, chemical process, etc.). The ease of the configuration process and the lack of any code development make it economically feasible to create entire families of industry-specific and market-specific software products without a corresponding increase in development time, or costly development staff. These new products are really the same executable image, differing only in the configuration information.

In accordance with another aspect of the present invention, a method and system are provided which provide protection from intentional or unintentional client machine flaws, O/S flaws, errors or omissions, desktop viruses, and other malicious software attacks. This protection is provided by architecturally segregating, critical functional areas of the application and moving them to protected areas.

In accordance with another aspect of the present invention, a method and system are provided which allows the single application to be reconfigured to alter its functionality while it is running and without interrupting its current operation. Further, the altered functionality is made available to all client machines without the need for installing additional software, rebooting or reworking in any way.

Other aspects will occur to those skilled in the art upon reading and understanding the following detailed description.

BRIEF DESCRIPTION OF THE DRAWINGS

The invention may take physical form in various parts and arrangements of parts, and in various steps and arrangements of steps. The drawings are only for purposes of illustrating exemplary embodiments including the presently preferred embodiment and are not to be construed as limiting the invention. In the accompanying drawings which are incorporated in and constitute a part of the specification, embodiments of the invention are illustrated, which, together with a general description of the invention given above, and the detailed description given below, serve to describe the example embodiments of the system and method. It will be appreciated that the illustrated boundaries of elements (e.g. boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vice versa.

DETAILED DESCRIPTION OF THE PREFERRED EMBODIMENTS

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Virus," as used herein includes any type of malicious software targeted toward desktops, personal computers, hand held devices and the like. This includes worms, trojans, and time bombs. Viruses can take many forms including executable images and script files. "Virus Immune," refers to the ability of a system to operate properly despite components of that system being infected or otherwise compromised by a virus. Operating properly includes both protection of data items and operations on those data items.

"Architecture," as used herein includes the logical organization of software components, showing the data paths between them. Architecture may also include the distribution of software functionality across hardware components or platforms.

Figure 2A:
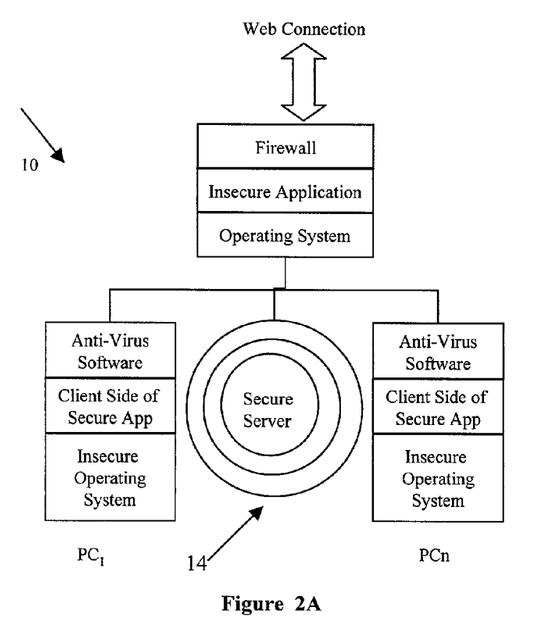
FIGS. 2A, 2B and 2C are architecture diagrams comparing the high-level system architecture suitable to practice the present invention to that of an exemplary system architecture contained within the prior art.
Figure 2B:
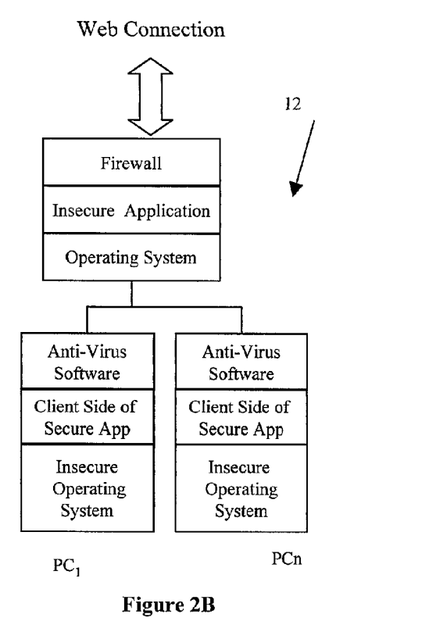

With reference now to FIGS. 2A and 2B, a system architecture that suitably practices the present invention's secure architecture 10 is shown in comparison to the traditional, non-secure architecture 12. The secure server executes a properly-configured secure O/S. Those skilled in the art will appreciate that the secure O/S implements a reference monitor 14 (or similar) structure in order to be secure. The reference monitor 14 enforces a predetermined and adjustable system security policy by controlling the access of every subject to every object within the system. The reference monitor 14 maintains an access control list (ACL) which determines which subjects have access to which objects and the manner of allowed access. Subjects can be active entities, user processes, etc. while objects can be files, directories, passive data repositories, etc. The reference monitor 14 also maintains a tamper proof audit trail so that security-related events can be tracked and reported.

As shown in FIG. 2A, in one embodiment, a system constructed according to the present invention allocates a portion for execution on the secure server while another portion executes on the client $PC_1$. Desirably, the client machine can be any common desktop PC with any common operating system, including Windows (all versions), Linux, OS/X (Macintosh), and the like. Indeed, as discussed more fully below, a system constructed according to the present invention is readily adaptable to operating systems yet to be introduced. The operating systems running on the client machines do not have to be secure.

Figure 2C:
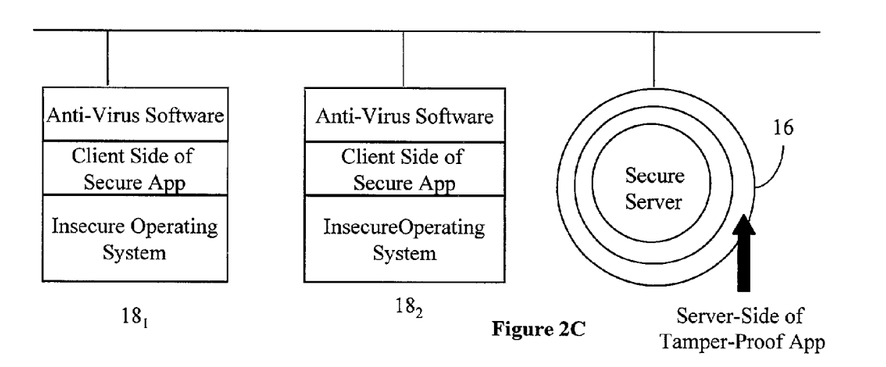

Turning now to FIG. 2C, the assignment of functionality between the TCB 16 (secure server plus secure O/S) and the various client machines 18 is shown. The portion of the invention that runs on the TCB 16 performs critical application functions where tampering must not occur. The database and program operations on the database are fully protected. The client portion of the invention performs less critical application functions where tampering may occur but is not damaging to the program data nor proper program operation. Examples of these less critical application functions are data display and other user interface functions. Those skilled in the art will appreciate that data display errors due to viruses or other malicious software cannot adversely affect the TCB 16 because the combination of the reference monitor's security attributes and the TCB's O/S architecture are not compatible with desktop executable images and/or script files. Since all viruses use desktop executable images and/or script files, they cannot execute on the TCB.

Figure 3:
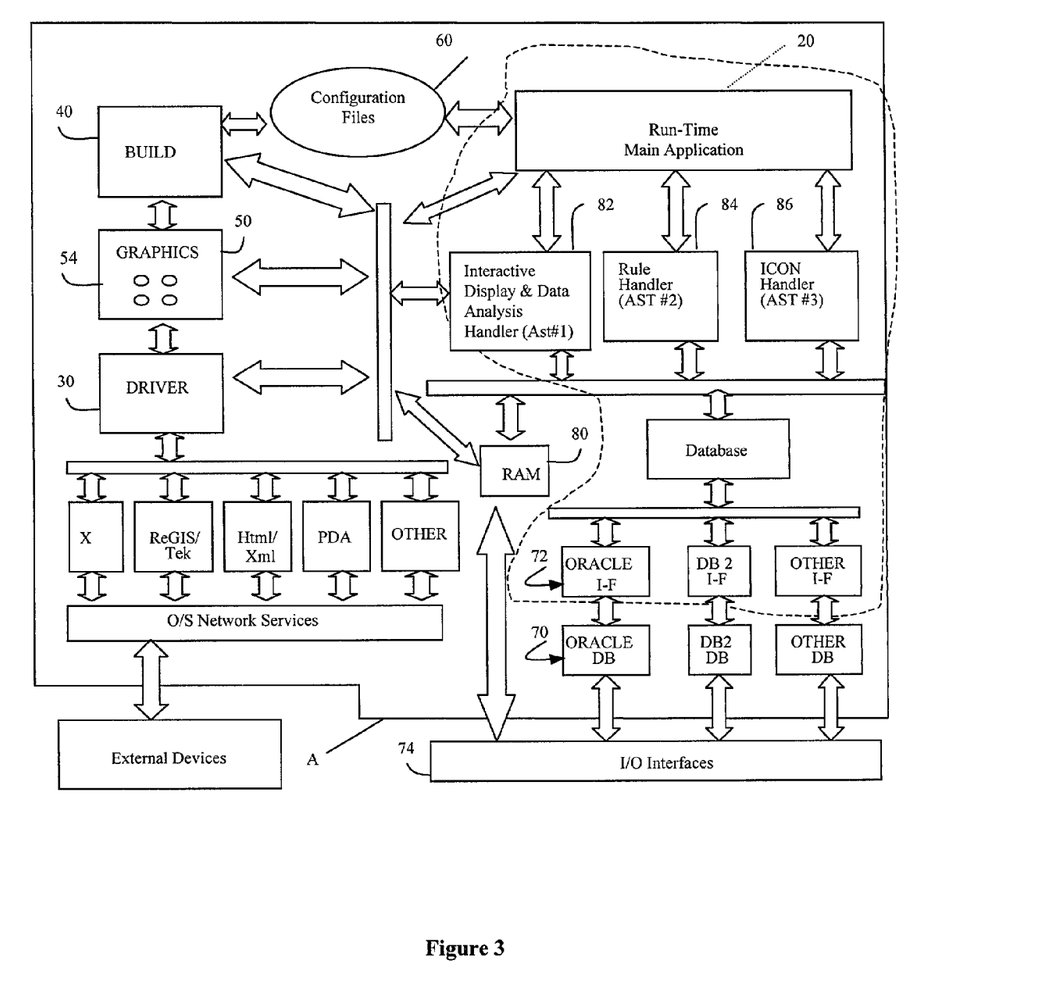
FIG. 3 is a functional block diagram of software architecture which suitably practices the present invention.

With reference now to FIG. 3, a system which suitably practices the present invention includes at least one computer platform with network management hardware A and an operating system. Those skilled in the art appreciate that such computer platforms and their operating systems are commercially available from manufacturers such as SUN, HP, Compaq, IBM and others. In one exemplary embodiment, network management hardware or server A runs a resident executable application which provides functionality to client machines in data communication with the server A. The resident executable application includes a number of VIEW 20 images corresponding to the number of users or client machines using the network. Preferably, a single DRIVER image 30 contains the interface components required to support communication with client machines and display devices. DRIVER 30 contains interface components, whether or not they are used by a specific application. DRIVER 30 is a sharable image that is installed once, independent of the number of simultaneous users, thus saving memory. VIEW 20 and BUILD 40 may use DRIVER 30 directly to interface with a client machine or display device, although it is more common to use GRAPHICS 50.

GRAPHICS image 50 contains the "Smart Objects" 54. These Smart Objects 54 comprise graphic images, display objects, interactive analysis objects, action icons, etc. In addition to their data presentation aspects, some Smart Objects may also contain data analysis rules and procedures. For example, one Smart Object could be an "X-bar-R Chart". The methods and formulas for computing the various statistical measures that comprise the X-bar-R Chart are well-known in the art. These well-known formulas, rules and/or procedures would be a part of the Smart Object called "X-bar-R Chart". Other Smart Objects could be charts, graphs, spreadsheets, tables, animated objects and the like. GRAPHICS 50 contains these various items, whether or not they are used in a specific application. GRAPHICS 50 is also a sharable image that is installed once, independent of the number of simultaneous users. VIEW 20 and BUILD 40 use GRAPHICS 50 to display, update and interact with objects, images, and the like. Those skilled in the art will appreciate that GRAPHICS 50 may include a wide variety of Smart Objects. Those skilled in the art will further appreciate that new Smart Objects, with new and powerful data presentation capabilities, data analysis rules and procedures, may be designed, built and added to GRAPHICS 50 at any time. Those skilled in the art will also appreciate that the various image modules, such as VIEW 20, DRIVER 30, BUILD 40, GRAPHICS 50, may be resident on server 10 or alternately distributed across the network or multiple servers.

Configuration files 60 comprise display/screen files, some menus, dialog boxes, help files, special images, some data analysis instructions, some operational rules and the like and are usually created by the BUILD 40 configurator/editor. Alternatively, some of the configuration files may be edited with a normal text editor. This allows non-graphic, text-based devices such as cellular and mobile phones to configure/modify the system—an advantage for supporting systems remotely where, for example, high-speed connections may not be available. Alternatively, some, or all configuration information may be contained in one or more relational databases 70.

Ram-resident database(s) 80 are non-executable images that are sharable, global storage areas for various kinds of real-time data and status information. Preferably, databases 80 are external to the executable application 20 although they may physically reside on the server as well as being disposed elsewhere on the network.

Relational databases 70 are optional. These can be any relational database such as Oracle, DB-2, Informix, Sybase, etc. Oracle is preferred but not required. These databases may contain historical data, object action rules, some data analysis rules and may include any or all other configuration information. Data communication with any or all of the relational databases occurs through specialized interfaces 72. Input/Output (I/O) handlers/interfaces 74 are also optional and support communication with intelligent instruments, PLCs, DCSs, controllers, foreign databases and the like. These I/O handlers implement the specific communication protocol(s) used by the various external devices and can communicate via a network or a dedicated serial port. These I/O handlers generally take data in ram-resident databases 80 or in relational databases 70 and send it to the particular external device. Conversely, these I/O handlers generally receive data from the external device and place it into either ram-resident databases 80 or in relational databases 70 or both. All communication with external devices, except for user display devices and client machines, is handled by one or more input/output handlers 74 (also called input/output drivers).

In a simple configuration, a system is composed of four executable images: VIEW 20, DRIVER 30, BUILD 40 and GRAPHICS 50. GRAPHICS 50 and DRIVER 30 are both sharable, re-entrant executable images that are used by all copies of VIEW 20 and BUILD 40. Beneficially, one copy of DRIVER 30 and GRAPHICS 50 is installed on a given system, even if there are many simultaneous users.

The BUILD 40 image is used to set up configuration files 60 and optionally relational databases 70 and ram-resident databases 80 so that VIEW 20 can read them and "morph", i.e., become, the customer-specific application. Although the term "morph" is used, VIEW does not change in any way. Rather, VIEW behaves differently, which is really what a new software application is all about—different behavior and/or functionality. Those skilled in the art will appreciate the significant distinction between this invention and standard, traditional object-oriented programming techniques. In object-oriented programming, significant new functionality in a program is implemented by creating new object(s) and/or re-linking existing ones to form a new executable image. This re-linking can often mean an interruption in program operation which may not be permissible in mission-critical situations. The unique architecture of this invention completely avoids this problem because a new executable image is never created at any time. Significant new functionality can be added simply by changing the configuration information which may be distributed across configuration files 60, relational databases 70 and ram-resident databases 80.

As listed above, a system may include the GRAPHICS, DRIVER, VIEW and BUILD, various configuration files and a database. For each specific application, the same VIEW, GRAPHICS and DRIVER images are used. Only the configuration files 60, the database 70 (often, but not always) and/or RAM 80 are altered. This is in sharp contrast to other application creation methods where components, modules, routines, etc. are added/edited/deleted and relinked to create a new executable image.

GRAPHICS 50 already contains the "Smart Objects" 54 needed. These Smart Objects 54 comprise graphic images, display objects, interactive analysis objects, action icons, etc. In addition to their data presentation aspects, some Smart Objects may also contain data analysis rules and procedures. If a given application does not need all of the Smart Objects, they are simply not used, even though they are still present in the software. Thus, GRAPHICS 50 stays the same regardless of the application. Some Smart Objects 54 are display objects, which control how information is displayed or how it appears to a user. Example Smart Objects are charts, tables, graphics, numbers, geometric shapes, equipment, images, and the like. Some Smart Objects 54 include data analysis procedures, rules, etc. within them that are object-specific and unique. Data analysis rules, procedures and object methods that are common to all Smart Objects are not included in the Smart Objects 54. Rather, common object methods are contained in the BUILD 40 module and VIEW 20 module as required. This saves considerable memory and allows these common object methods to be changed dynamically, providing unprecedented flexibility. Smart Objects 54 are typically static, but may be configured by the BUILD 40 module during the configuration process. They are configured to do a very wide variety of things, including (but not at all limited to) getting data, performing mathematical analyses, graphic animation, changing in response to external conditions, etc. Each Smart Object has its own specific set of things that it is able to do. One skilled in the art will appreciate that many Smart Objects with different visual display and data handling attributes can easily be defined and added to Graphics 50 at any time. Such additional Smart Objects are within the scope of the present invention.

Similarly, DRIVER 30 already contains the components needed to interface with all client machines and/or display devices. If a given application does not need all of the interface components (because, for instance, the client machines are all of the same type) then the other interface components are simply not used, even though they are still present in the software.

The VIEW utility 20 is the one executable image that runs on the server (HP, Sun, Compaq, Linux, etc.). It is typically the only executable image that is needed for a system. This executable image is relabeled as required to look like an industry-or market-specific software product, but the actual executable image is still VIEW 20 and is not changed. As previously explained, changing the configuration information can make the VIEW 20 image behave like a completely different product.

To advantageously make one image look and act like a completely different product, the configuration information, contained in either files 60, relational databases 70 or RAM 80 or any combination, is changed. The configuration information 60, 70, 80 tells VIEW 20 how to operate, including what to display, what database tables, fields, datatypes to use, what data to analyze, how to analyze it, what menus to show, what menu options to execute, what dialog boxes to have, what help files to have, what action(s) to take as a consequence of user input or data value change, what rules to implement, what external/internal procedures to run, etc. So, different configuration information 60, 70, 80 will make VIEW 20 act like a different software product, including defining a set of actions and events on which the actions are predicated.

Also to make one image appear and function differently, it reads the configuration information 60, 70, 80 and behaves accordingly. This requires an innovative software architecture with a high degree of flexibility.

Architecturally, in one embodiment VIEW 20 consists of two parts I, II. Part I reads the configuration information 60, 70, 80 for the menus, dialog boxes, etc. and sets up the user interface accordingly. Part I also reads the display configuration files as requested by external events and/or user input. Based upon the display files read by Part I, Part II gathers data, dynamically routes it to the proper Smart Object(s) 54 performs some limited analyses (most analyses are done by each Smart Object), looks for desired events and takes the corresponding action(s) as required.

Part II acts as a spawned process that executes at a dynamically adjustable rate. Part II includes three components: interactive display and data analysis handler 82; rule handler 84; and icon handler 86. Note that Part II may be a spawned process or may be an internal routine that can be scheduled to execute as needed. This design choice is a function of the capabilities of the particular server's operating system.

The interactive display and data analysis handler 82 gets application data from services specified by the configuration information 60, 70, 80. As further dictated by the configuration information, analysis or computations are performed and data, results, and the like are stored in places also specified by the configuration information.

Rule handler 84 reads rules from sources specified in configuration information 60, 70, 80 and executes these rules. Typically, these rules are generic and may specify data sources, data operations, and destinations for both application data and computational results. One skilled in the art will appreciate that for some applications of the invention, data obtained from an external source may correspond to a real-world event that occurred. Conversely, one skilled in the art will further appreciate that writing data to a destination may cause an action to be taken. For example, a "Pressure Safety Rule" could be constructed such that if the pressure in a pipe exceeds a certain threshold, then a safety valve should be opened to release fluid and reduce the pressure. In this example, the communication handler and/or the I/O driver ensures that external pressure data is placed in either the ram database 80 or the relational database(s) 70 or both. The communication handler and/or the I/O driver also ensures that the "Pressure Safety Rule" data output (i.e., opening the safety valve) is sent to the external control device. The specific data formats, data locations, data sampling rates, etc. are set up as part of the system configuration process using BUILD 40.

Icon handler 86 is a routine that reads a subset of simpler rules contained in the icon Smart Objects 54 in the displays. These icons and the rules they contain are set up during the configuration process using BUILD 40. Icon handler 86 reads these rules in the icon and executes them. This results in the icons obtaining information from the configuration information 60, 70, 80 and producing results that may be stored to other locations identifiable through the configuration information. Icons can also receive user input directly via mouse clicks, keyboard commands, and dialog boxes. Further, icon information can also be password protected or conform to other authorization schemes. Exemplary events monitored in this fashion include thresholds, rates of change, user inputs, time, comparison results, and the like. Representative actions in response to these events include getting particular screens, altering a display, running an internal job, issuing commands to external applications, setting or changing menu options, writing an output or result to a location, performing calculations, and the like.

The BUILD configurator 40 (editor) is used to set up the configuration data 60, 70, 80 for the VIEW utility 20. In a preferred embodiment, BUILD looks and feels like a graphics editor. This makes it easy and intuitive to learn. BUILD produces the configuration data required for the particular application. This configuration information specifies which Smart Objects 54 to use, what each object's data source(s) are, what processing is to be done on the data and how the object's appearance is to be altered as a function of the data and subsequent processing and functionality as discussed above.

For data sources that are within a relational database 70, the tables, views, fields, data types, data processing, TCP/IP address, account and password, etc. are typically set up via BUILD. SQL queries, common "where clauses", database triggers, and such all may be set up as part of the configuration process via BUILD 40.

For RAM-resident database 80, the data sources, the pointer(s) to the data locations, the data identifiers are also typically set by BUILD 40. Also, data processing rules can be established by BUILD to provide the behavior demanded by the application. These data processing rules are normally saved in the configuration files 60 but can also be placed in the relational database 70.

"Action Icons" are one kind of Smart Object in GRAPHICS 50. These objects associate an event with an action. Using BUILD 40, an "event" is defined to observe, for example: a threshold value for a real-time input, a database field value, an alarm condition, or a user input (i.e., a mouse click). Then, an action is defined for whenever this event occurs. For example, the action can be to display a new report/screen, force a real-time output to a new value, write to a table/field in the database, or any of a variety of actions. Configuring an action icon to perform an action is done through BUILD 40. As is the case with other configuration information, the action icon settings are normally saved in the configuration files 60 but can also be placed in the relational database 70.

When VIEW 20 executes (i.e., the application is running) it looks for the requested event(s). When one or more of the events occur, VIEW 20 takes the requested action(s). One possible action is to spawn an external (i.e., a foreign) job feeding data or pointers to external applications. For example, if VIEW is configured to act as an environmental monitoring software system, it may have to recalibrate environmental sensors from time to time. Since sensor re-calibration applications are normally supplied by the sensor manufacturer, an action icon might be configured to launch this app whenever a sensor re-calibration is needed. The action icon would not have to know anything specific about the operation of the sensor re-calibration app. It is now apparent that the action icon would only have to know the app identifier, initial parameters to be sent to it and the command string to launch it. This powerful feature allows the integration of pre-existing foreign and perhaps incompatible software without having to understand it or link to it at the code level. A command string is sent to the operating system of the machine where the app to be launched resides. The operating system interprets the command string and launches the application. This allows use of pre-existing, specialized applications whenever required. One skilled in the art will appreciate that there are many simple variations of this idea for using pre-existing, external software without connecting to it at the code level. All such variations are within the scope and spirit of the invention.

As an example, if an anomalous condition is detected, VIEW 20 can automatically launch and communicate with a pre-existing application specifically designed to handle the anomalous condition. This powerful feature advantageously employs other software and pre-developed, pre-tested applications. This powerful feature also eliminates unnecessary code development that would traditionally be required to take advantage of external, specialized apps.

Figure 4:
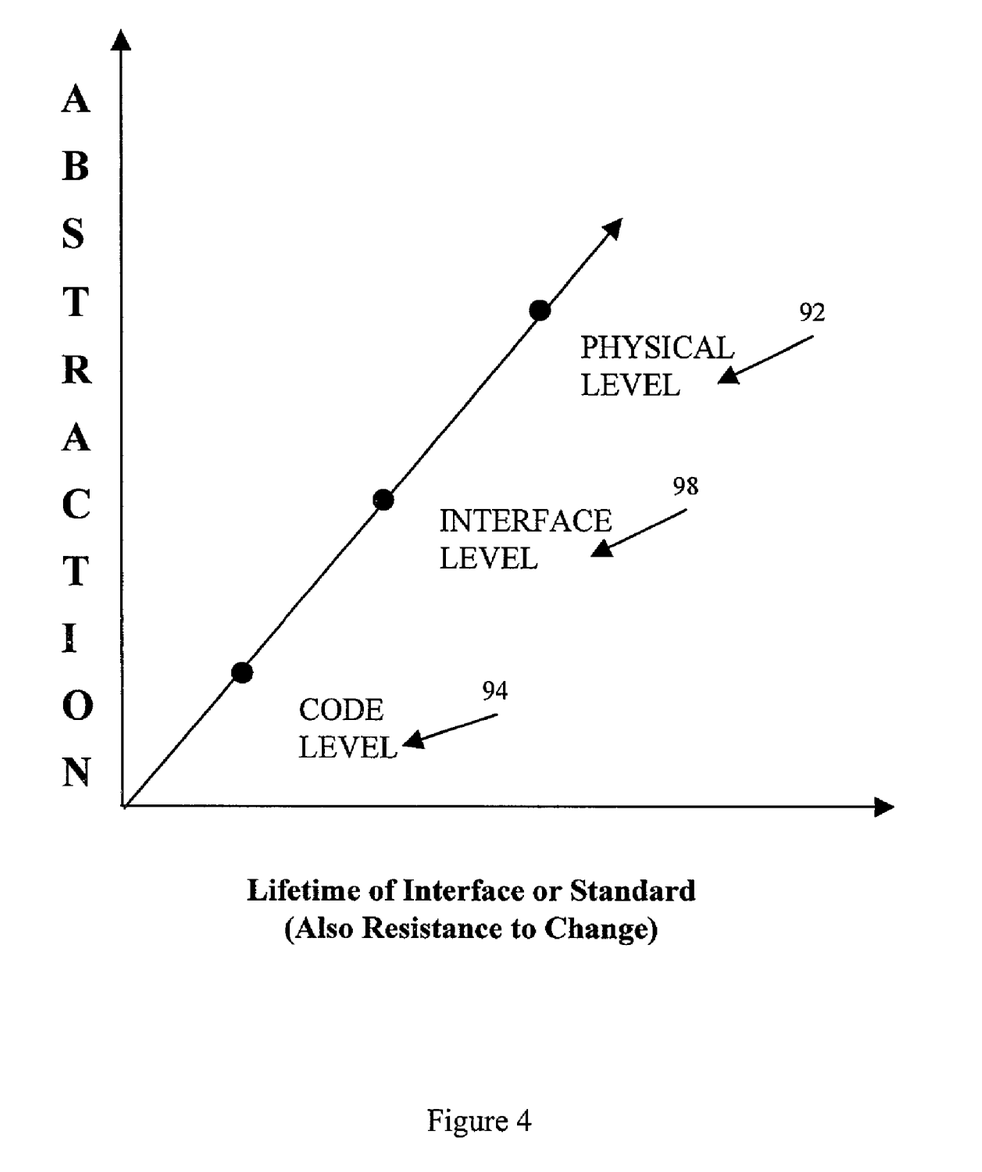
FIG. 4 is a graph representative of increasing levels of abstraction of the computing environment.

Referring to FIG. 4, a chart illustrates levels of abstraction within the computing environment. Illustrated are exemplary levels at which "compatibility" is required. At the top, physical user 92 interface compatibility is among the highest abstraction including, for example, the display screen, mouse, keyboard, speakers and the like. In other words the computing environment is compatible with the human sensory system. Toward the other side, individual applications are designed to have software, or code level 94 compatibility. This level of abstraction deals with proper paths, subroutine calls, APIs and the like. It can now be appreciated that towards the lower levels of abstraction, change often occurs relatively quickly. However, resistance to change increases as the level of abstraction increases. Additionally, at lower levels, decisions which relate to compatibility are often made by few people, perhaps a single company. On the other hand, as the level of abstraction increases, compatibility decisions become more decentralized.

A recent attempt at compatibility at the code level 94 and an object lesson into why compatibility at this level tends to be inconsistent with market place realities is the introduction and evolution of JAVA. The JAVA language was created by Sun Microsystems and was intended to allow software development in one common language, without regard to the underlying operating system or computer platform. Microsoft obtained a license for the JAVA technology and began inserting proprietary extensions to the JAVA language. These proprietary language extensions later appeared in a Microsoft programming manual called "J++". These proprietary extensions were not seen by Sun as being compatible with the JAVA language standard. The tension was that Microsoft wanted to push their proprietary language extensions so that programs written in J++ would only work on Microsoft platforms, thus defeating the entire interoperability purpose of JAVA in the first place. This tension eventually resulted in litigation with the practical upshot being that Microsoft has launched a new operating system, Windows XP, which is not JAVA-compatible. This entire language evolutionary process took less than six years. Thus, at the code level, change is quite rapid and "new" and "universal" standards may not be standards at all for very long.

Above code level is the "interface level" 98. This level tends to be multi-vendor controlled and standardized, and thus supported for relatively long periods of time. Examples of software interfaces at this level are TCP/IP, SQL, X-Windows, etc. One aspect of the present invention is a software system that provides interoperability and cross-platform functionality at or above the interface level 98. One skilled in the art recognizes that interfaces have a much longer lifetime—often ten times the lifetime—than operating system APIs and other code-level conventions. Consequently, standardizing at the interface level results in a software system with a much longer lifetime than standardizing at the code level. It is an aspect of this invention to standardize at or above the interface level.

Figure 5:
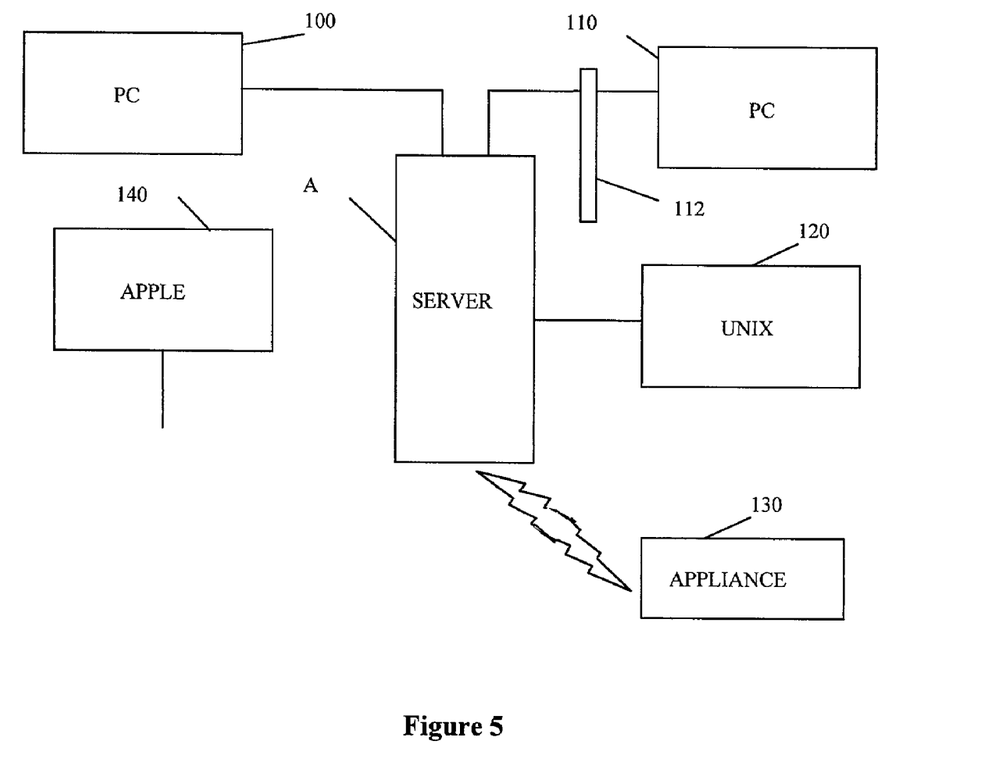
FIG. 5 is an exemplary network diagram which suitably practices the present invention.

With reference now to FIG. 5, a network is illustrated which includes a various client machines with various operating systems and network connections operably connected to the server A'. Client machine 100 is a Wintel device directly connected to the server A', while client machine 110 is another Wintel device, perhaps with a more recent operating system, connected to the server A' through a data bus 112. Client machine 120 is a representative UNIX device connected via a parallel data cable, while personal appliance 130, such as a PDA, telephone or other device is connected via serial wireless connection. Those skilled in the art will appreciate that any data connection mechanism such as RF, infrared, or hardwire connection may be substituted with no loss of functionality. Client machine 140 is an Apple device on the network to further illustrate platform independence.

Platform independence is achieved by the client-server architecture. New desktop platforms are treated as clients. They are not used as servers, but may optionally be used as such, depending upon their capabilities. New clients may be added at any time if they are already supported by Driver 30. New client types are accommodated simply by creating a translation module for the new client type and adding it to Driver 30. The translation modules convert the client-independent interface information used by the single application into a form understood by the new client type. For some client types, an X-Windows emulation performed by Driver 30 would suffice. Web-based clients such as browsers, for example, would use the XML/HTML capabilities of Driver 30. One skilled in the art will appreciate that any number of new client types may be added in this fashion. This architecture allows the inexpensive and non-secure client machines to be used for what they are best suited for: high-performance, interactive data presentation devices that handle user interface tasks and perform some local analysis functions.

Since the desktop, and indeed most client machines, change rapidly, using the desktop as an interactive data display/data entry device with some local analysis capability makes the most design sense. By comparison, changing the server architecture every few months to keep up with desktop changes is very costly, time consuming, error-prone and may not add any value, functionality, reliability, speed, and the like.

Data analysis is rule-based. Data analysis capabilities are built into each display symbol or Smart Object 54 in the symbol library or GRAPHICS 50. Each symbol can be set to appear as desired, perform arithmetic and mathematical computations, send results to a database, etc. Additionally, "non-visible" symbols can be used to do the same operations. For special cases, code can be written to handle analyses that do not fall into a standard category. Generally speaking, a new Smart Object 54 is created and/or additional functionality is added to existing Smart Object(s) 54 to handle such situations.

Data acquisition is done by the server A. It can also be done by external equipment such as sensors sending real-time messages to the server, in any format. Client machines which are used for human-system interaction can be used for data acquisition but are not recommended for this duty. Isolation of the data acquisition, analysis and storage features provide virus-immunity because client machines or other virus-prone devices are isolated from the server and databases. This also preserves the interrupt-driven real-time performance of the data acquisition process. Additionally, many viruses employ scripts or binary code configured to exploit WINTEL based systems. Desirably, these scripts and codes are ignored by systems under an embodiment of the present invention due to the non-WINTEL architecture employed in such embodiments.

For applications that are not time-critical, acquired data can be transferred to a relational database 70 (FIG. 2). Data can also be acquired directly from one or more existing relational databases via SQL/ODBC. Data is acquired from control equipment and instrumentation via the specific manufacturer's communication protocol and hardware interface. This varies from device to device. In any case, the acquired data is either written to a RAM-resident database 80 (for applications requiring sub-second response) or directly to a relational database 70 such as Oracle.

In one embodiment, the application typically uses non-Microsoft platform(s) for the server. These platforms usually have a real-time OS (Compaq's Tru64 UNIX, OpenVMS, HP-UX and Sun Solaris). They are also relatively immune to desktop viruses because they do not run common desktop operating systems and typically do not have the virus-prone MS-software (Outlook, Excel, Explorer, etc.). Such servers are also more secure in their fundamental design and have protection against malicious software that is simply unavailable in common consumer-type desktop platforms. The server architecture and O/S also allows rigorous and effective protection schemes to be incorporated into the application so that the software will continue to operate properly even in the presence of viruses and other malicious software.

With continued reference to FIG. 5, an MS client machine, such as 100, in a system practicing the present invention may be affected by viruses. In this case, the infected client machine 100 will not be able to perform the display/user interaction functions because of the virus. On the other hand, database, data acquisition, data analysis functions are done on the protected server A' and not relegated to the client machines 100, 110, 120, 130, 140. Thus, these critical functions are protected and immune from infection by viruses originating on or designed against MS products or any client.

This also keeps desktop-based viruses from hindering the operation of systems constructed according to an embodiment of the teachings of the invention. When a desktop is infected, it may cease to function properly (if at all) but it will not in any way affect the operation of the server or system herein disclosed. As an additional security measure, preferably, non-Microsoft operating systems are employed on the server. Such operating systems are real-time, 64-bit, hyper-reliable, reducing the likelihood of problems such as viruses.

Figure 6:
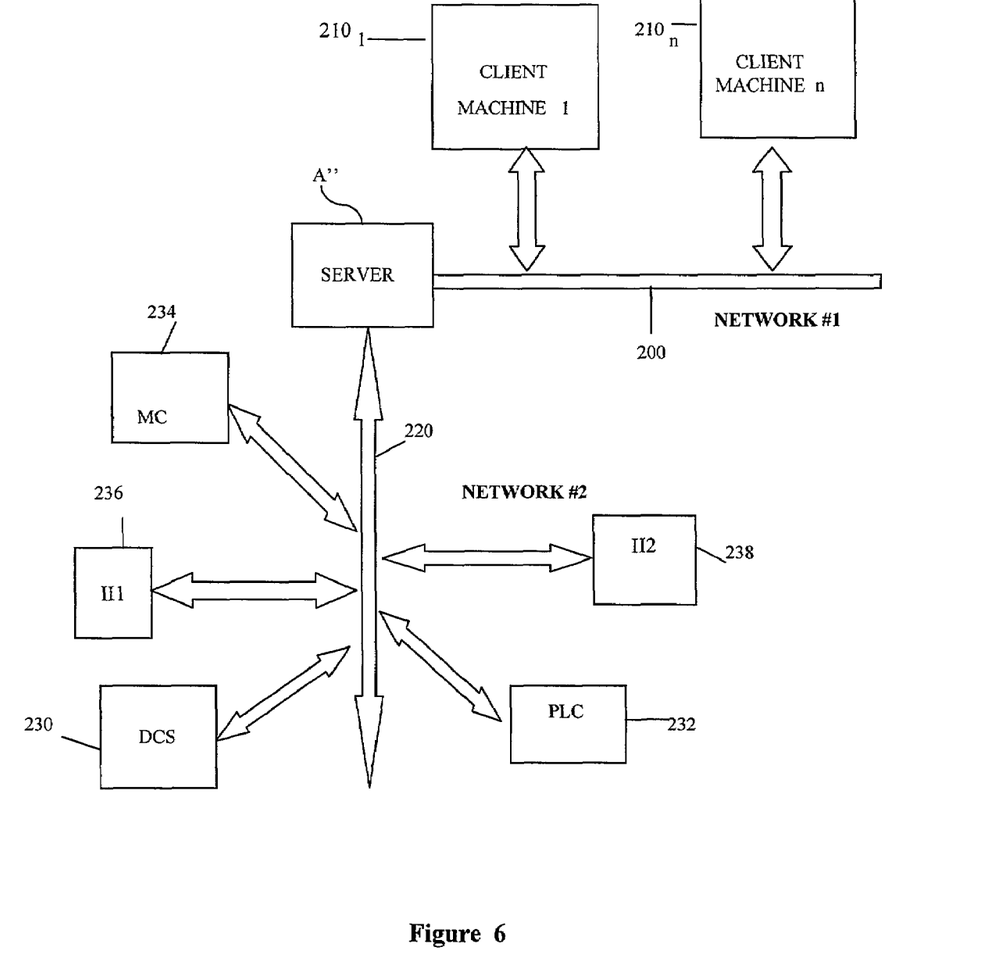
FIG. 6 is another exemplary network diagram which suitably practices the present invention.

With reference now to FIG. 6, a first network 200 including a plurality of client machines $210_1$-$210_n$ is connected to a server A" residing on a second network 220 having various components such as interfaces 230, 232, 234, 236, 238. As illustrated, the second network 220 supports server A" by providing access to remote input/output interfaces such as distributed control system 230, programmable logic controller 232, microcontrollers 234 and other intelligent instruments 236, 238.

Figure 7:
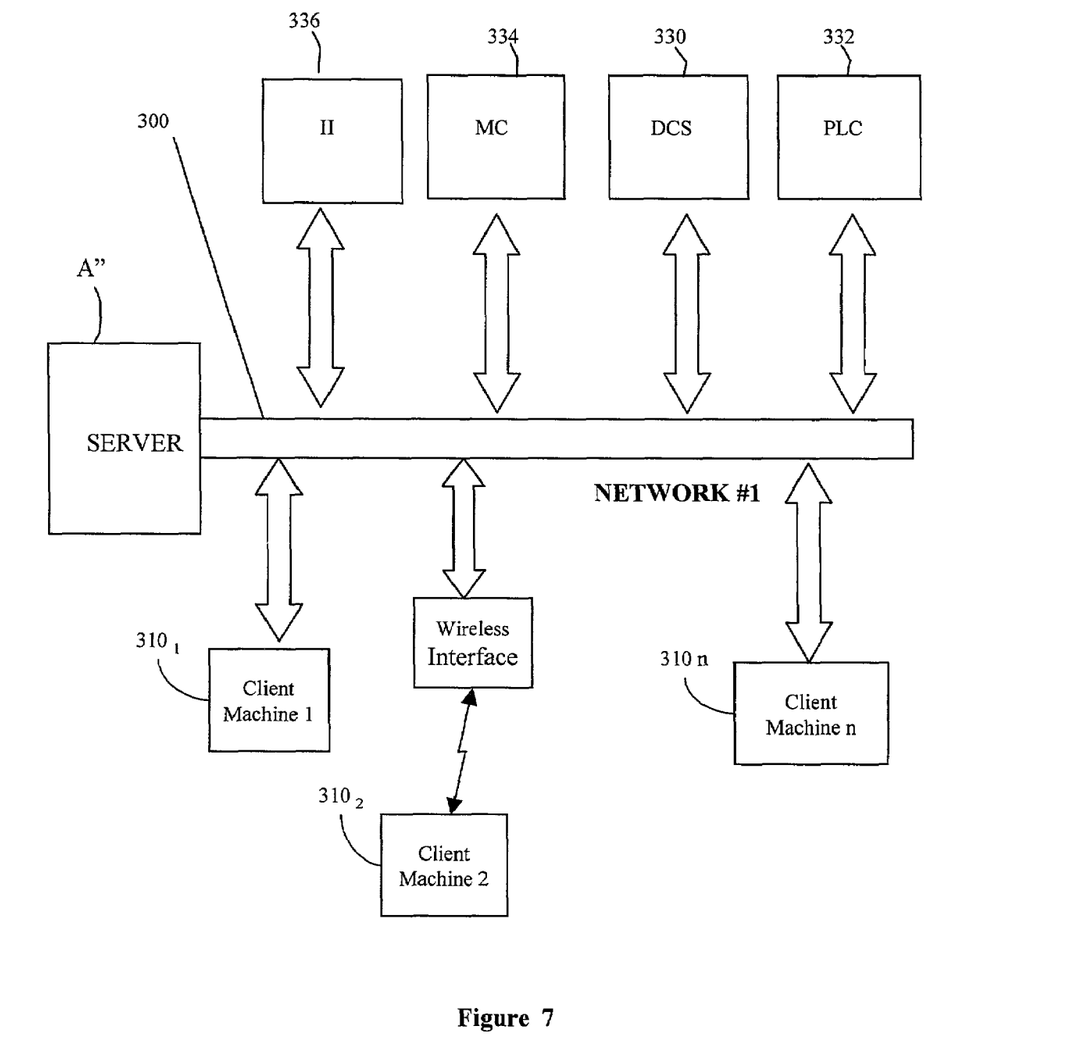
FIG. 7 is yet another exemplary network diagram which suitably practices the present invention.

With reference now to FIG. 7, a single network 300 includes both plurality of client machines $310_1$-$310_n$ and interfaces 330, 332, 334, 336, connected to server A'.

Figure 8:
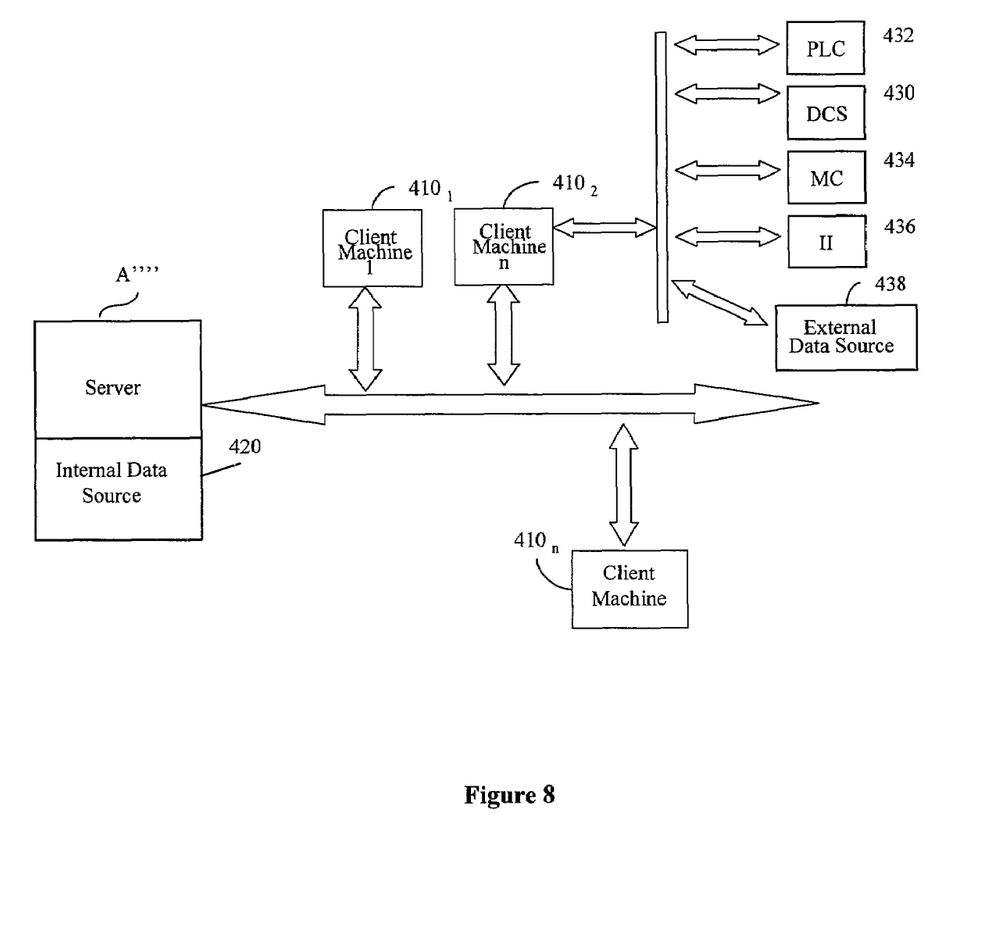
FIG. 8 is still another network diagram which suitably practices the present invention.

With reference now to FIG. 8, a network 400 includes a plurality of client machines $410_1$-$410_n$ and an internal data base 420 within server A"". Interfaces 430, 432, 434, 436 and an external data base 438 are in data communication with the network through a selected client machine 410₂.

Those skilled in the art can now appreciate that the exemplary networks have been relatively simple to ease comprehension and that much larger more complicated networks are possible through the teachings of the present invention. Additionally, the examples set forth herein are not mutually exclusive. Thus, combinations and sub-combinations of components of each are within the spirit of the invention. The invention has been described with reference to several exemplary embodiments. Potential modifications and alterations will occur to others upon a reading and understanding of the specification. It is intended that the invention be construed as including all such modifications and alterations insofar as they come within the scope of the append claims or the equivalents thereof.

What is claimed is:

1. A virus immune, rule based software system comprising:
   a software image for displaying a user interface, encoded on a computer-readable medium disposed on a secure server sharable over an non-secure computer network among a plurality of clients, the user interface set up views to act as interface between the users and the software image, the software image containing a plurality of objects having determined attributes; and
   a plurality of replicated soft-ware images, at least one of the replicated software images corresponding to each client, the plurality of replicated software images configured to execute rules contained in configuration information and the plurality of objects, where upon execution of the rules each replicated software image causes a processor remote from the client and associated with the system to operate with an industrial-specific or user-specific functionality defined by the rules.

2. The software system as set forth in claim 1, where the plurality of replicated software images further comprise a database interface configured to provide data communication between the software image disposed on the secure platform and an external database.

3. The software system as set forth in claim 1, further comprising a translator configured to provide data communication between a selected one of the replicated software images and each client.

4. The software system as set forth in claim 3, where the translator provides data communication with each client at the interface level.

5. The software system as set forth in claim 1, further comprising software in data communication with the software image, the software configured to modify attributes of the objects.

6. The software system as set forth in claim 1, further comprising software in data communication with the software image, the software configured to write the configuration information.

7. In a network having a secure server including a static executable application encoded on a computer-readable medium connected to at least one non-secure client acting as interface, the static executable application comprising:
   a single software image sharable among each client and containing a plurality of objects having determined attributes; and
   a plurality of replicated software images, at least one of the replicated software images corresponding to each client, the plurality of replicated software images responding to rules contained in configuration information providing a virtual software application to operate industrial-specific or user-specific functionality defined by the configuration information and remotely located from the at least one non-secure client.

8. The static executable application as set forth in claim 7, where the plurality of replicated software images further comprise a database interface configured to provide data communication between the static executable application and an external database.

9. The static executable application as set forth in claim 7, further comprising a translator configured to provide data communication between the static executable application and each client.

10. The static executable application as set forth in claim 9, where the translator communicates with each client at or above the interface level.

11. The static executable application as set forth in claim 10, where the interface level is selected from the set of X-Windows, ReGIS, tek, HTML/XML, Palm, and personal digital assistants.

12. The static executable application as set forth in claim 7, further comprising software in data communication with the software image, the software configured to write the configuration information.

13. In a computer system having a secure first node and a non-secure second node, a development system to build at least one custom application package, the development system comprising:
   a storage device, coupled with the first node, for storing a plurality of configuration information;
   a single system application, coupled with the first node having functionality determined by the configuration information;
   the second node operable for data communication and interface functionality with the single system application over a network;
   an object library, coupled with the storage device and the single system application, the object library maintaining an inventory of objects, and indicating the location of each object; and
   a build system coupled with the configuration information and object library, the build subsystem modifying the configuration information or object library, altering the functionality without re-linking; and
   a replicatable software image corresponding to the second node disposed at the first node, the replicatable software image responding to rules contained in configuration information and selected objects to function as an industrial-specific or user-specific application interfacing with the second node.

14. The development system as set forth in claim 13, where the single system application comprises a database interface configured to provide a communication path to an external storage device.

15. The development system as set forth in claim 13, further comprising a translator configured to provide a node specific communication path to the second node at or above the interface level.

16. The development system as set forth in claim 13, where the first node comprises a secure server and the second node comprises an non-secure system.

17. The development system as set forth in claim 13, where the build system modifies the configuration information online while the replicatable software image runs.

18. A virus immune system comprising:

a secure server having functionality caused by software encoded on a computer-readable medium, where the software includes a first component sharable between a plurality of client devices and a second component capable of replicating to correspond each client device, the first component configured to provide interface functionality with the plurality of client devices and a replicated second component configured to provide application functionality to the associated client device; and at least one non-secure client device capable of data communication with the secure server over a network; and rules accessible to the secure server where the rules cause the second component to function as an industrial-specific or user-specific application operating on data provided from the non-secure client device, and to provide data to the non-secure client device through the first component.

* * * * *